United States Patent Office 2,970,122
Patented Jan. 31, 1961

2,970,122
MIXED CATALYSTS FOR CURING SILICONE RESINS

Joseph R. McLoughlin, Burnt Hills, N.Y., assignor to General Electric Company, a corporation of New York
No Drawing. Filed Apr. 14, 1958, Ser. No. 728,028
5 Claims. (Cl. 260—18)

This invention is concerned with the curing of organopolysiloxane resins. More particularly, the invention relates to a composition of matter capable of curing rapidly at elevated temperatures comprising (1) an organopolysiloxane resin having on the average from 1.05 to 1.9 organic groups per silicon atom, said organic groups being selected from the class consisting of monovalent hydrocarbon radicals, cyanoalkyl radicals, halogenated aryl hydrocarbon radicals, and mixtures of such radicals, (2) from 0.01 to 1 percent, by weight, triethanolamine, and (3) from 0.01 to 1 percent, by weight, of a metal in the form of a metallic salt selected from the class consisting of zinc octoate, iron octoate, tin octoate and cobalt octoate, the weights of (2) and (3) being based on the weight of the organopolysiloxane resin.

U.S. Patent 2,449,572, Welsh, issued September 21, 1948, discloses the use of various organometallic salts as curing agents for silicone resins. In general, these resins are heated at elevated temperatures and the presence of the organometallic salt causes acceleration of the cure to the substantially infusible and insoluble state. However, it has been found that using these organometallic salts individually, the time for effecting cure of the silicone resins is unduly high. In addition, excessively large amounts of such curing agents are often required to obtain the desired cure.

In U.S. Patent 2,528,696, Pedersen, is disclosed the use of triethanolamine as a curing agent for silicone resins. Although such a curing catalyst is capable of converting the organopolysiloxane resin to the infusible and insoluble state, again there are problems involved in the use of such materials. Unduly long times are required to effect the desired cure and, in addition, the amounts of triethanolamine employed to obtain the desired properties are often quite large and have undesirable effects on the properties of the cured resin.

Unexpectedly, I have discovered that a combination of triethanolamine and either zinc octoate, iron octoate, tin octoate or cobalt octoate as a combination curing agent for organopolysiloxane resins effects a more rapid cure of the resin to give a product whose properties are at least equal to and, in some respects, superior to those obtained by curing the same resin with either the triethanolamine alone or the above organometallic salt alone. This increase in the rate of cure is of a substantial nature and constitutes an important commercial advantage. In addition, I have also unpredictably found that the amount of the mixture of the triethanolamine and organometallic salt required to obtain the above desired degree of cure is smaller than has heretofore been required to obtain the same properties in the cured material using each curing agent alone.

The triethanolamine catalyst employed herein has the formula

The octoate portion of the zinc, iron, tin and cobalt octoates is the 2-ethylhexoate radical. Examples of such organometallic salts may be mentioned, for instance, zinc 2-ethylhexoate, iron 2-ethylhexoate, tin 2-ethylhexoate, and cobalt 2-ethylhexoate. Mixtures of such salts may also be used with the triethanolamine.

The organopolysiloxane resin with which the present invention is concerned may be any of those which are well known in the art, many examples of which may be found in the above-mentioned Welsh patent and in Rochow Patents 2,258,218–222. Any organopolysiloxane resin in which the organic radicals attached to the silicon atoms are, e.g., monovalent hydrocarbon radicals or substituted hydrocarbon radicals, e.g., halogenated aryl hydrocarbon radicals, cyanoalkyl radicals, etc., can be employed in the composition of this invention. These include alkyl radicals, e.g., methyl, ethyl, propyl, butyl, isobutyl, decyl, octadecyl, etc., radicals; alkenyl radicals, e.g., vinyl, allyl, methallyl radicals, etc.; cycloaliphatic radicals such as cyclohexyl, cyclohexenyl radicals, etc.; aromatic hydrocarbon radicals, e.g., phenyl, tolyl, xenyl, xylyl, benzyl, phenylethyl, etc. radicals; cyanoalkyl, e.g., cyanoethyl, cyanopropyl, etc., radicals; halogenated aryl radicals, e.g., chlorophenyl, bromoxenyl, hexafluoroxylyl, etc. Such organopolysiloxanes may be considered as having the general formula

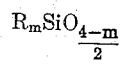

where R is monovalent hydrocarbon radical or substituted hydrocarbon radical, many examples of which have been given above, and $m$ is a value from 1.05 to 1.9. The presence in the organopolysiloxane resin of silicon-bonded hydroxyl groups is not precluded.

The preferred organic radicals are methyl and phenyl. Consequently, the preferred siloxane units employed in the resins of this invention are monomethylsiloxane, dimethylsiloxane, diphenylsiloxane, monophenylsiloxane and phenyl methylsiloxane units. The resins of this invention may also contain limited amounts of $SiO_2$ units and siloxane units of the type $R_3SiO_{0.5}$ in which R has the meaning given above. In all cases the ratio of organic radicals to silicon should be within the above defined range.

The amount of catalyst employed is generally very small and advantageously ranges from about 0.01 to 1.0 percent, by weight, of the triethanolamine and from 0.01 to 1.0 percent, by weight, of the aforesaid four metals in the form of the respective organometallic salts, the percent weights of each being based on the weight of the organopolysiloxane resin solids.

If desired, various fillers, particularly powdered fillers, may be employed in the compositions disclosed and claimed in the instant invention. Among such fillers may be mentioned, for instance, titanium dioxide, diatomaceous earth, fume silica, ferric oxide, kaolin clay, glass fibers, asbestos fibers, etc. If desired, the resinous compositions of the instant invention may be applied to various cloths, particularly heat-resistant cloth, such as asbestos cloth and glass-cloth, and thereafter cured to convert the organopolysiloxane resins to the infusible and insoluble state. When employing the organopolysiloxane resin containing the mixture of curing catalysts, it is generally advantageous to dissolve the resin and catalyst in a suitable solvent which is a mutual solvent for both the catalysts and the resin. Among such solvents may be mentioned, e.g., xylene, toluene, butanol, mixtures of the aforesaid solvents, etc. When treating, for instance, glass cloth or asbestos cloth, it is generally desirable to heat the treated cloth at temperatures of from 100 to 150° C. for short periods of time to volatilize the solvent and to render the cloth tack-free, and thereafter complete the cure at the same or even higher temperatures, depending on the application for the treated cloth.

In general, the curing of the compositions of this invention can be varied within wide ranges. Generally, such curing temperatures may range from about 100° to 300° C. When molding mixtures of the resin with the curing catalyst, either alone or in combination with fillers, it may be desirable to carry out the curing cycle at temperatures of from about 150° to 250° C. at pressures ranging from about 100 p.s.i. or higher.

In order that those skilled in the art may better understand how the present invention may be practiced, the following examples are given by way of illustration and not by way of limitation. All parts are by weight.

The organopolysiloxane resin employed in the following examples was obtained by cohydrolyzing 50 mol percent dimethyldichlorosilane, 45 mol percent phenyltrichlorosilane, and 5 mol percent diphenyldichlorosilane. This resin was dissolved in toluene to about a 50 percent solids content.

The cure of the resins with the respective catalysts was determined as follows: Five drops of the resin solution were dropped from an eye-dropper onto a metal plate maintained at a temperature of 150° C. or 200° C. as the case may be. The puddle thus formed was continuously stirred with a spatula until a gel stage was reached. The end point or cure of the resin was considered the gel time of the resin which was actually determined by stringing the resin from the cure plate by picking up the resin with the end of the stirring instrument or spatula. When the resin failed to string or the string broke close to the cure plate, this was considered as the cure time of the resin. This test is a well-known one in the art for determining curing rates of resins and is quite accurate and can be reproduced within very small experimental error. In the following tests, each test result was the average of three cure tests.

EXAMPLE 1

In this example, zinc octoate, cobalt octoate, stannic octoate, and ferric octoate were mixed with triethanolamine in varying concentrations and these mixtures of catalysts were incorporated in the above-described methyl phenylpolysiloxane resin. As controls, the triethanolamine alone and the metallic salt alone were also employed as catalysts for the same methyl phenylpolysiloxane resin. The following Table I shows the results of these cure times (using the above cure test) employing the individual curing agents and the combinations of curing agents at temperatures of cure, in one instance 150° C., and in another instance at 200° C. In each case, the percent catalyst, whether the metal in the form of the salt or the triehanolamine, was based on the resin solids in the methyl phenylpolysiloxane resin solution. All the metallic salts were in the form of the 2-ethylhexoate salt.

Table I

CURE TIME AT 150° C.

| Test No. | Metalloorganic Catalyst and Percent | | Triethanolamine, Percent | Cure Time, Seconds |
|---|---|---|---|---|
| 1 | Zinc octoate | 0 | 0 | Over 1,000. |
| 2 | do | 0.1 | 0 | About 360. |
| 3 | do | 0.5 | 0 | About 160. |
| 4 | do | 0.1 | 0.05 | About 140. |
| 5 | do | 0.5 | 0.05 | 78. |
| 6 | do | 0.1 | 0.1 | 55. |
| 7 | do | 0.1 | 0.4 | 12. |
| 8 | do | 0 | 0.4 | 225. |
| 9 | do | 0.03 | 0.1 | 75. |
| 10 | do | 0.1 | 0.1 | 55. |
| 11 | do | 0.5 | 0.1 | 35. |
| 12 | do | 0.03 | 0.4 | 14. |
| 13 | do | 0.1 | 0.4 | 13. |
| 14 | do | 0.5 | 0.4 | 12. |
| 15 | Iron octoate | 0 | 0.05 | Over 1,000. |
| 16 | do | 0 | 0.1 | Over 1,000. |
| 17 | do | 0 | 0.4 | About 260. |
| 18 | do | 0.03 | 0.1 | About 100. |
| 19 | do | 0.03 | 0.4 | About 8.0. |
| 20 | do | 0.1 | 0.1 | About 75. |
| 21 | do | 0.1 | 0.4 | About 4.0. |
| 22 | do | 0.5 | 0.1 | About 16. |
| 23 | do | 0.5 | 0.4 | About 4.0. |
| 24 | Cobalt octoate | 0.1 | 0 | 175. |
| 25 | do | 0.5 | 0 | 75. |
| 26 | do | 0.5 | 0.05 | 69. |
| 27 | do | 0.5 | 0.1 | 60. |
| 28 | do | 0.5 | 0.4 | 60. |
| 29 | do | 0.1 | 0.4 | 16. |
| 30 | do | 0.03 | 0.4 | 23. |
| 31 | Stannic octoate | 0.03 | 0 | Over 1,000. |
| 32 | do | 0 | 0.4 | 260. |
| 33 | do | 0.03 | 0.4 | 30. |
| 34 | do | 0.1 | 0.4 | 8. |

CURE TIME AT 200° C.

| | | | | |
|---|---|---|---|---|
| 35 | Zinc octoate | 0 | 0 | Over 1,000. |
| 36 | do | 0.5 | 0 | 26. |
| 37 | do | 0.5 | 0.05 | 15. |
| 38 | do | 0.5 | 0.1 | 10. |
| 39 | do | 0.5 | 0.4 | 4. |
| 40 | Cobalt octoate | 0 | 0.1 | 190. |
| 41 | do | 0.1 | 0 | 20. |
| 42 | do | 0.1 | 0.1 | 12. |
| 43 | Stannic octoate | 0 | 0.05 | 400. |
| 44 | do | 0.03 | 0 | 280. |
| 45 | do | 0.03 | 0.1 | 50. |
| 46 | do | 0.03 | 0.4 | 5. |

EXAMPLE 2

In this example a methyl phenylpolysiloxane resin prepared by cohydrolyzing a mixture of ingredients comprising 39 mol percent methyltrichlorosilane, 51 mol percent phenyltrichlorosilane, and 10 mol percent of diphenyldichlorosilane was dissolved in toluene to a solids content of about 60 percent and thereafter used to treat (i.e., coat and impregnate) glass cloth. Prior to treatment of the glass cloth, there was incorporated in the resin solution a mixture of 0.2 percent triethanolamine and 0.075 percent zinc as zinc octoate based on the methyl phenylpoylsiloxane resin solids in the resinous solution. The impregnated glass cloth was heated at a temperature of about 100° C. for a short period of time to remove the solvent and to render the resin tack-free. This gave a composition in which about 45 percent, by weight, thereof was methyl phenylpolysiloxane resin and 55 percent, by weight, was the glass cloth. The impregnated cloth was stacked in the form of a laminate several layers thick and then molded for 3 hours at 175° C. and thereafter postbaked in an oven for 18 hours at 250° C. The laminates were found to have exceedingly high flexural strengths at 25° C. and at 250° C., and the bondstrengths of the laminate at 25° C. and 250° C. were also high.

It will, of course, be apparent to those skilled in the art that, in addition to the concentrations of the metalloorganic salts and the triethanolamine employed in the preceding examples, other concentrations thereof may be used without departing from the scope of the invention. In addition, other organopolysiloxanes, many examples of which have been given above, including methylpolysiloxanes in which all the organic groups are methyl groups attached to silicon by carbon-silicon linkages, e.g., methylpolysiloxanes; methylethylpolysiloxane; methylvinylpolysiloxanes; methyl phenylpolysiloxanes containing siliconbonded phenyl groups having nuclearly substituted halogen, e.g., chlorine, etc., may also be employed without departing from the scope of the invention.

The compositions of the instant invention in the cured state have good dielectric properties, are thermally stable at elevated temperatures, and are substantially inert. Because of these properties, they can be advantageously employed in the molding of various electrical insulators, structural members and other applications where thermal stability and mechanical strength and electrical resistance are needed. The conjoint catalyst system greatly reduces the sensitivity of the resin to the catalyst and enables one to exercise better control over the cure of the resin than was possible when employing the catalysts separately.

What I claim as new and desire to secure by Letters Patent of the United States is:

1. A composition of matter consisting essential of (1) an organopolysiloxane resin having on the average from 1.05 to 1.9 organic groups per silicon atom, said organic groups being selected from the class consisting of monovalent hydrocarbon radicals, cyanoalkyl radicals and halogenated aryl radicals, (2) from 0.01 to 1 percent, by weight, triethanolamine, and (3) from 0.01 to 1 percent, by weight, zinc in the form of zinc octoate, the weights of (2) and (3) being based on the weight of the organopolysiloxane resin.

2. A composition of matter consisting essentially of (1) a methyl phenylpolysiloxane resin having on the average from 1.05 to 1.9 total methyl and phenyl groups per silicon atom, (2) from 0.01 to 1 percent, by weight, triethanolamine and (3) from 0.01 to 1 percent, by weight, zinc in the form of zinc octoate, the weights of (2) and (3) being based on the weight of the methyl phenylpolysiloxane resin.

3. A composition of matter consisting essentially of (1) a methylpolysiloxane resin having on the average from 1.05 to 1.9 methyl groups per silicon atom, (2) from 0.01 to 1 percent, by weight, triethanolamine, and (3) from 0.01 to 1 percent, by weight, zinc in the form of zinc octoate, the weights of (2) and (3) being based on the weight of the methylpolysiloxane resin.

4. A laminate comprising a plurality of layers of glass cloth superposed upon each other and coated and impregnated with a mixture of ingredients consisting essentially of (1) an organopolysiloxane resin having on the average from 1.05 to 1.9 organic groups per silicon atom, said organic groups being selected from the class consisting of monovalent hydrocarbon radicals, cyanoalkyl radicals, and halogenated aryl radicals, (2) from 0.01 to 1 percent, by weight, triethanolamine, and (3) from 0.01 to 1 percent, by weight, zinc in the form of zinc octoate, the weights of (2) and (3) being based on the weight of the organopolysiloxane resin.

5. A laminate as in claim 4 in which the organopolysiloxane resin is a methyl phenylpolysiloxane resin having an average of from 1.05 to 1.9 total methyl and phenyl groups per silicon atom.

References Cited in the file of this patent

UNITED STATES PATENTS

| | | |
|---|---|---|
| 2,449,572 | Welsh | Sept. 21, 1948 |
| 2,620,317 | Johannson | Dec. 2, 1952 |
| 2,658,881 | Hirsch | Nov. 10, 1953 |
| 2,718,483 | Clark | Sept. 20, 1955 |